(12) United States Patent
Ortlieb et al.

(10) Patent No.: US 11,775,689 B2
(45) Date of Patent: Oct. 3, 2023

(54) INTEGRATION OF PICTORIAL CONTENT INTO SECURE SIGNATURE DOCUMENTS

(71) Applicant: DocuSign, Inc., San Francisco, CA (US)

(72) Inventors: Travis Ortlieb, Seattle, WA (US); Brent Robinett, Seattle, WA (US); Erica Berg, Seattle, WA (US); Micheline Chagniot, San Francisco, CA (US); Mark Ramasco, Seattle, WA (US); Mangesh Bhandarkar, San Francisco, CA (US)

(73) Assignee: DocuSign, Inc., San Francisco, CA (US)

( * ) Notice: Subject to any disclaimer, the term of this patent is extended or adjusted under 35 U.S.C. 154(b) by 296 days.

(21) Appl. No.: 16/887,334

(22) Filed: May 29, 2020

(65) Prior Publication Data
US 2021/0374284 A1    Dec. 2, 2021

(51) Int. Cl.
*G06F 40/174*    (2020.01)
*G06V 40/30*    (2022.01)
*G06F 21/62*    (2013.01)
*G06F 21/64*    (2013.01)

(52) U.S. Cl.
CPC .......... *G06F 21/64* (2013.01); *G06F 21/6209* (2013.01); *G06F 40/174* (2020.01); *G06V 40/33* (2022.01); *G06F 2221/2147* (2013.01)

(58) Field of Classification Search
CPC ................ G06F 21/6209; G06F 21/64; G06F 2221/2147; G06F 40/166; G06F 40/169; G06F 40/174; G06V 40/33
See application file for complete search history.

(56) References Cited

U.S. PATENT DOCUMENTS

| | | | |
|---|---|---|---|
| 9,542,377 B2 * | 1/2017 | Hunter | G06F 16/148 |
| 9,716,861 B1 * | 7/2017 | Poel | H04M 7/0027 |
| 2005/0177389 A1 * | 8/2005 | Rakowicz | G06Q 50/167 |
| | | | 713/157 |
| 2007/0011067 A1 * | 1/2007 | Seelos | G06Q 10/00 |
| | | | 705/35 |

(Continued)

OTHER PUBLICATIONS

How to validate the image size before uploading?, pp. 1-4 (https://web.archive.org/web/20161123103324/https://stackoverflow.com/questions/27309921/how-to-validate-the-image-size-before-uploading) (Year: 2016).*

*Primary Examiner* — Scott T Baderman
*Assistant Examiner* — Mario M Velez-Lopez
(74) *Attorney, Agent, or Firm* — Shumaker & Sieffert, P.A.

(57) ABSTRACT

A system and a method are disclosed for enabling pictorial content to be added to a secure document. In an embodiment, a secure document tool receives a request, from an administrator of the secure document, to enable modification of a region of the secure document with an addition of pictorial content, the secure document configured to prevent modification of contents of the secure document by a signer, the secure document enabled to accept a signature on the secure document by the signer. The secure document tool receives, from the signer, a command to add pictorial content to the region, and responsively adds the pictorial content to the region. The secure document tool receives from the signer, a signature on the secure document, and responsively disables the secure document from accepting further modifications.

18 Claims, 7 Drawing Sheets

(56) References Cited

U.S. PATENT DOCUMENTS

| | | | |
|---|---|---|---|
| 2007/0288355 A1* | 12/2007 | Roland | G06Q 10/00 |
| | | | 705/38 |
| 2008/0131362 A1* | 6/2008 | Rousso | A61M 5/1782 |
| | | | 424/1.11 |
| 2010/0106973 A1* | 4/2010 | Guenther | H04L 9/3231 |
| | | | 713/176 |
| 2012/0221944 A1* | 8/2012 | Bloomfield | G06Q 10/10 |
| | | | 715/255 |
| 2014/0222695 A1* | 8/2014 | Yang | G06Q 10/10 |
| | | | 705/311 |
| 2015/0026478 A1* | 1/2015 | Raduchel | H04L 9/3247 |
| | | | 713/176 |
| 2015/0150141 A1* | 5/2015 | Szymanski | G06F 21/64 |
| | | | 726/26 |
| 2016/0179776 A1* | 6/2016 | Bartley | G06Q 20/027 |
| | | | 715/268 |
| 2016/0203586 A1* | 7/2016 | Chang | G06F 16/5838 |
| | | | 382/203 |
| 2016/0212201 A1* | 7/2016 | Munemann | H04L 67/306 |
| 2017/0012993 A1* | 1/2017 | Lieu | G06F 40/117 |
| 2017/0124028 A1* | 5/2017 | Amsterdam | G06F 16/958 |
| 2018/0267946 A1* | 9/2018 | Dang | G06F 40/174 |
| 2018/0337994 A1* | 11/2018 | Dachille | G06F 21/6245 |
| 2019/0266196 A1* | 8/2019 | Boyce | G06N 3/08 |
| 2019/0340428 A1* | 11/2019 | Wickett | H04L 51/224 |
| 2019/0354706 A1* | 11/2019 | Bartlett | G06F 40/171 |
| 2020/0151243 A1* | 5/2020 | Chauhan | G06F 3/048 |
| 2020/0258176 A1* | 8/2020 | Gibson | G06F 21/32 |
| 2021/0233646 A1* | 7/2021 | Le Naour | G06T 11/00 |
| 2021/0319083 A1* | 10/2021 | Bernardi | H04L 9/3247 |
| 2021/0374284 A1* | 12/2021 | Ortlieb | G06F 21/64 |
| 2022/0086133 A1* | 3/2022 | Killoran, Jr. | H04L 63/08 |

\* cited by examiner

INTEGRATION OF PICTORIAL CONTENT INTO SECURE SIGNATURE DOCUMENTS

TECHNICAL FIELD

The disclosure generally relates to the field of secure digital documents, and more particularly relates to enabling modification of secure signature documents by associated parties with pictorial content.

BACKGROUND

Secure digital documents (interchangeably referred to herein as "secure documents" and "secure signature documents") are rigid documents that include information that cannot be modified by a signing user. Some secure documents enable a signing user to add textual information to pre-designated forms (e.g., biographical information, such as a user's name, address, and so on), but go no further. This limitation precludes signing users from including important information into a secure document that does not fit a form prompt, thus requiring any information that does not fit into a rigid form to be communicated external to the document, which results in inefficient bandwidth and storage usage.

SUMMARY

Systems and methods are disclosed herein for enabling pictorial content to be added to a secure document. An administrator of a secure document may designate one or more regions of a form to enable a participant of the secure document (e.g., a signer) to add pictorial content, such as an image, or a doodle using a drawing tool. Rules or restrictions may be applied to types of pictorial content that can be added, or to what the contents of that pictorial content may include. In a secure document where multiple participants have access to the secure document (e.g., multiple signers, a signer and a reviewer, etc.), some participants may be authorized to add pictorial content, while others may not. Some advantages realized include an ability to incorporate all necessary data, whether textual or not, within a single secure document or envelope, thus minimizing a need for communicating and storing messages external to the secure document, which reduces bandwidth consumption, processing power, and storage bloat.

In an embodiment, a secure document service receives a request, from an administrator of the secure document, to enable modification of a region of the secure document with an addition of pictorial content, the secure document configured to prevent modification of contents of the secure document by a signer, the secure document enabled to accept a signature on the secure document by the signer. For example, the request enables a region to accept an upload of a photograph, a doodle, or both. The secure document service receives, from the signer, a command to add pictorial content to the region (e.g., a selection of a photograph, and a selection of a user interface icon to include the photograph in the region), and, responsive to receiving the command, adds the pictorial content to the region.

In an embodiment where the secure document requires a signature from a signer in order to be complete, the secure document service receives, from the signer, a signature on the secure document. Responsive to determining that the pictorial content has been added and the signature has been received, the secure document service disables the secure document from accepting further modifications. Thus, the secure document is established to be in final form, including the added pictorial content.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment for Secure Document Service

Figure 1:
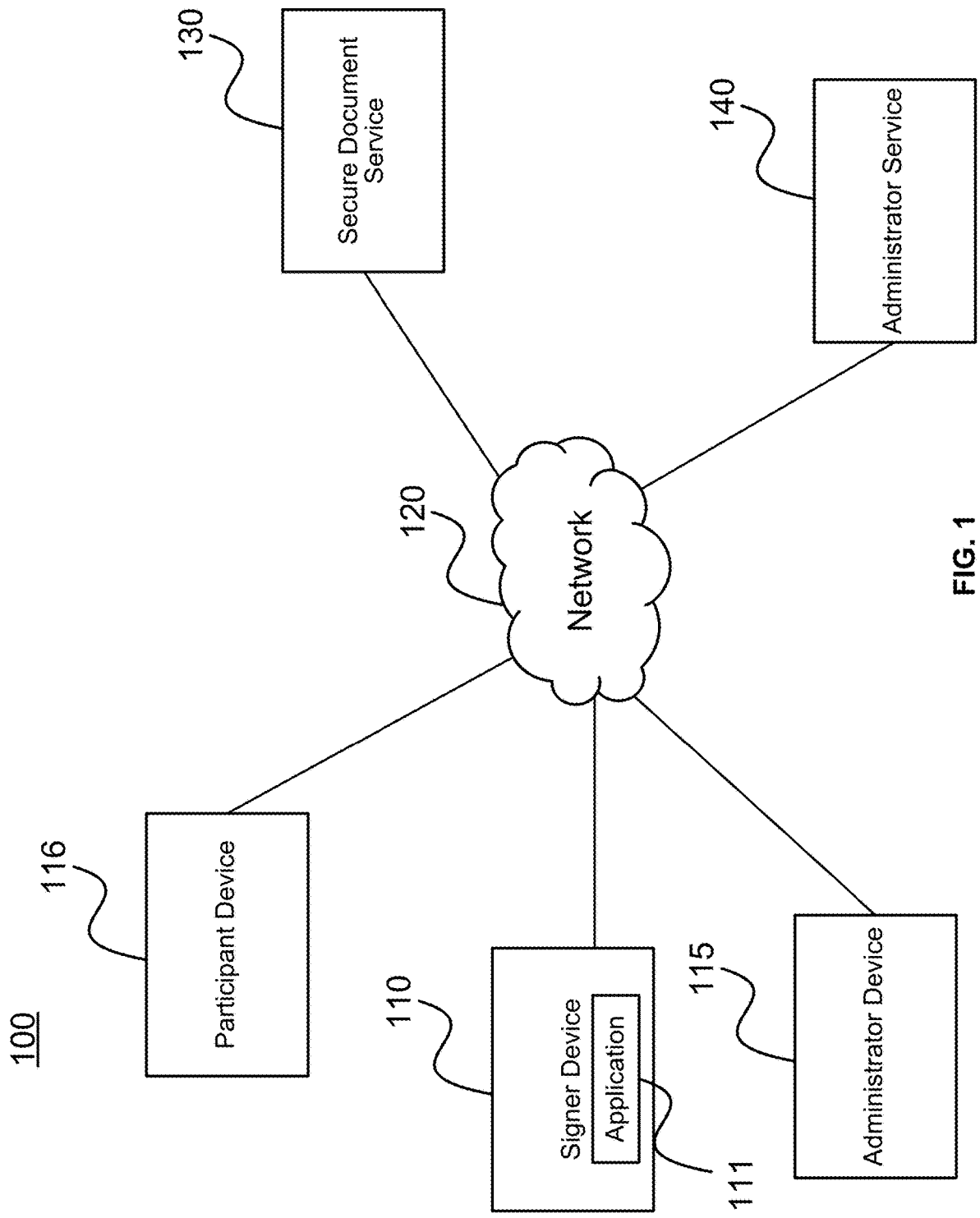
FIG. 1 illustrates one embodiment of a system environment for implementing a secure document service that enables a participant of a secure document to add pictorial content.

FIG. 1 illustrates one embodiment of a system environment for implementing a secure document service that enables a participant of a secure document to add pictorial content. Environment 100 includes various client devices, such as signer device 110 (with application 111 installed thereon), administrator device 115, and participant device 116. The client devices communicate with secure document service 130 and/or administrator service 140 through network 120. The term client device, as used herein, may refer to a computing device such as smartphones with an operating system such as ANDROID® or APPLE® IOS®, tablet computers, laptop computers, desktop computers, electronic stereos in automobiles or other vehicles, or any other type of network-enabled device from which secure documents may be accessed or otherwise interacted with. Typical client devices include the hardware and software needed to input and output sound (e.g., speakers and microphone) and images, connect to the network 110 (e.g., via Wifi and/or 4G or other wireless telecommunication standards), determine the current geographic location of the client devices 100 (e.g., a Global Positioning System (GPS) unit), and/or detect motion of the client devices 100 (e.g., via motion sensors such as accelerometers and gyroscopes).

Signer device 110 is operated by a signer of a secure document. The term signer, as used herein, may refer to a person designated to sign (or execute, as used interchangeably herein) a secure document. While only one signer device 110 is depicted, any number of signers may be designated to sign a secure document, and those signers may share a signer device or may each operate their own signer device. The term sign, as used herein, may refer to applying a digital signature to a secure document. An administrator of a secure document may designate what qualifies as a complete signature to a secure document, and may require initialing, multiple signatures, selecting a selectable option in lieu of applying a written or typed signature, and so on, to deem a document to be fully executed or completely signed.

Signer device 110, as depicted, has application 111 installed thereon. Any or all client devices in environment 100 may have application 111 installed thereon. Application 111 may be a stand-alone application downloaded by a client device from secure document service 130. Alternatively, application 111 may be accessed by way of a browser installed on the client device, accessing an application instantiated from secure document service 130 using the browser. In the case of a stand-alone application, browser functionality may be used by application 111 to access certain features of secure document service 130 that are not downloaded to the client device. Application 111 may be used by a client device to perform any activity relating to a secure document, such as to create, design, assign permissions, circulate, access, sign, modify, add pictorial content, and so on. For the purpose of simplicity, this disclosure is described in the context of signers—however, the disclosure applies equally to other entities associated with the secure document (e.g., the participants described herein).

Administrator device 115 is operated by an administrator of a secure document. The term administrator, as used herein, may refer to a person who creates a secure document and/or who has authority to administer the document by changing, granting, or denying rights to, or restrictions on, performing activity with respect to the secure document. More than one administrator may be assigned to a secure document, and in such a case, the plural administrators may administer the secure document using a same administrator device 115, or using their own administrator devices. Any client device may act as an administrator device or a signer device; a participant may input access credentials when accessing application 111, which will determine the participant's role with respect to a secure document.

Participant device 116 is used by a participant of a secure document. The term participant, as used herein, may refer to a user who has access to a document for any reason. The term participant may encompass a signer of a secure document, an administrator of a secure document, and other users who may access the secure document but neither have signing nor administrator privileges. A participant may be enabled to modify portions of a document to include textual and/or pictorial content, as designated by an administrator. An example of a participant that does not have signing privileges may include a medical assistant that is to draw in a check mark or circles around a photograph uploaded by a patient prior to a doctor reviewing the document in order to draw the doctor's attention to certain portions of the photograph. Many use cases exist in other contexts for having a non-signatory participant modify a document, several of which will be described in exemplary, and non-limiting fashion, in further detail below.

As mentioned before, client devices access secure document service 130 and/or administrator service 140 through network 120. Network 120 is typically the Internet, but may be any network, including but not limited to a Local Area Network (LAN), a Metropolitan Area Network (MAN), a Wide Area Network (WAN), a mobile wired or wireless network, a private network, or a virtual private network. Secure document service 130 provides application 111 to client devices, and additionally performs functionality connected to secure documents, including creation, verification, rights management, storage, circulation, and so on. While secure document service 130 is depicted as a single entity, secure document service 130 may be implemented through functionality spread across and/or replicated across a plurality of servers. Moreover, some or all of the functionality of secure document service 130 may be integrated into application 111 for on-board processing at a client device. Further details of secure document service 130 are discussed below with respect to FIG. 2.

Administrator service 140 is a third-party service associated with administrators of a secure document. Example administrator services include back-end processors of an insurance claim processor, a doctor or physical therapist's office, a car rental company, and so on. Administrator services 140 may leverage pictorial content added to secure documents in order to improve downstream processing of the secure document. For example, an insurance claim processor may use image recognition to look at photographs added to a secure document for an insurance claim to determine whether a claim requires human review (e.g., where damage to a car is extreme, claim may be automatically processed as a total loss of the vehicle; where zero damage is detected, claim may be automatically denied; human review may occur outside of these extremes).

Secure Document Service Implementation

Figure 2:
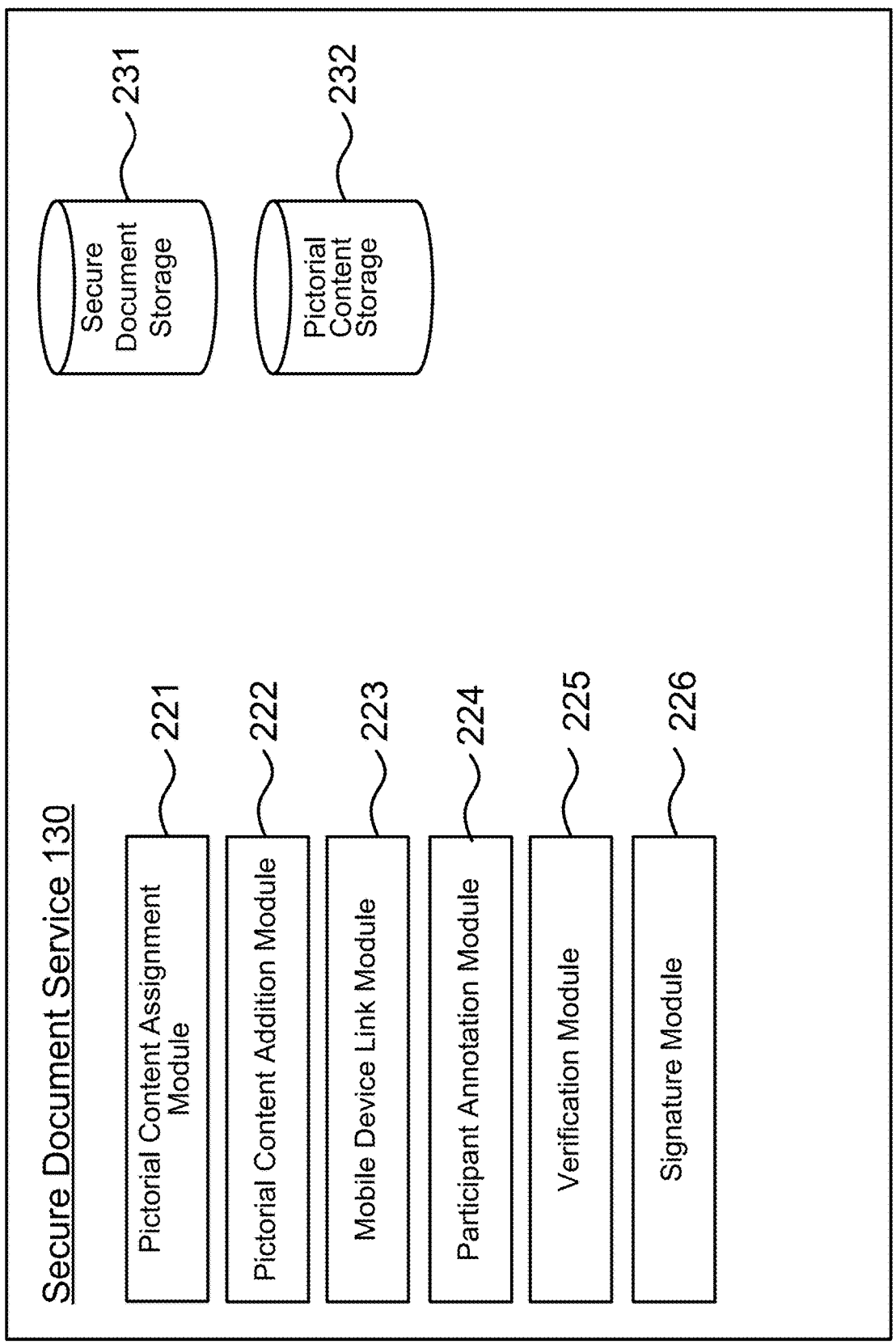
FIG. 2 illustrates one embodiment of exemplary modules and databases used by a secure document.

FIG. 2 illustrates one embodiment of exemplary modules and databases used by a secure document. Secure document service 130 includes various modules, such as pictorial content assignment module 221, pictorial content addition module 222, mobile device link module 223, participant annotation module 224, verification module 225, and signature module 226. Secure document service 130 also includes various databases, such as secure document storage 231 and pictorial content storage 232. The particular modules and databases shown in FIG. 2 are merely exemplary; fewer or more modules or databases may be used to achieve the functionality described herein. Moreover, while described below as implemented within secure document service 130, some or all of the modules and/or databases described herein may be implemented on a client device (e.g., as modules running within application 111, as databases stored in memory on a client device, etc.).

During, and/or after, creation of a secure document by an administrator, pictorial content assignment module 221 may detect a request from the administrator to enable pictorial content to be added to the secure document. The term pictorial content, as used herein, may refer to non-text-based content, such as drawings (interchangeably referred to as doodles herein) that are drawn in to the secure document (e.g., using a pen or paint tool), photographs and other forms of image capture (e.g., x-ray or infrared imaging), or a combination thereof (e.g., a doodle to annotate a portion of a photograph). Pictorial content assignment module 221 may detect the request based on the administrator interacting with a selectable option on a document template that enables a portion of the document to accept pictorial content. Responsive to detecting the request, pictorial content assignment module 221 may enable to portion of the secure document to accept the pictorial content.

As part of the request, pictorial content assignment module 221 may determine requirements for modifying the secure document to include pictorial content based on input by the administrator. The requirements may include an authentication component, where persons who can add pictorial content must have a certain access credential (e.g., a password), or where those persons are pre-specified and must have matching login credentials to add the pictorial content. The requirements may include a type of pictorial content (e.g., image, drawing, or a combination of both), and any or all of the types may also have authentication components. For example, persons who can draw on top of the image may be limited to those with higher-level access credentials. The requirements may include a requirement that particular content exist within the pictorial content. For example, the administrator may require that the pictorial content include a photograph that has a license plate of a car depicted, and may verify (e.g., using verification module 225 as discussed below) that this requirement is satisfied before adding the pictorial content to the secure document. Any form of requirement subject to verification may be imposed, such as requiring the signer or participant be in a particular geographic region when adding pictorial content, as well as requiring the image to have a timestamp that is within a threshold amount of time of a current time, and so on. The requirements may include a requirement that a participant verify and agree that the pictorial content is satisfactory. Any other form of requirement may be imposed on the pictorial content itself.

In addition to imposing requirements on the form of pictorial content, pictorial content assignment module 221 may determine, based on commands from the administrator, boundaries of where pictorial content may be added. To this end, pictorial content assignment module 221 may output a user interface to the administrator with options for defining the region in which pictorial content may be added. The user interface may enable the administrator to draw a box where pictorial content is to be added, for example, or to define the region in any other manner. The user interface may also include selectable options for defining a type of pictorial content that is to be enabled for modifying the secure document, and any of the aforementioned requirements.

Following creation of a secure document, one or more participants may receive a request from secure document service 130 to review, add content to (e.g., fill out forms with text, add pictorial content, etc.), and optionally, sign the secure document. Alternatively, one or more participants may proactively access the secure document by logging in to application 111, and seeing the secure document on a menu of active secure documents. Either way, when a participant requests to access the secure document, secure document service 130 provides the document to the participant (e.g., as retrieved from secure document storage 231). The participant may select a selectable option corresponding to a region enabled for addition of pictorial content. Responsive to detecting the selection of the selectable option, pictorial content addition module 222 may enable the participant to add pictorial content to the secure document, depending on the requirements associated with the region.

In an embodiment where access credentials must be satisfied, pictorial content addition module 222 may determine whether the participant satisfies those credentials (e.g., by verifying that the participant is designated as permitted to add pictorial content to that region, by prompting the participant to enter an access code, and so on). After authenticating the participant (if required), pictorial content addition module 222 may prompt the participant to add pictorial content to the region. In an embodiment where drawing is permitted, pictorial content addition module 222 may provide a user interface to the participant with a drawing tool, where the user may access a pen tool, a paint tool, or similar, and draw or doodle information. Optionally, the user interface may include options to select from a pallet of colors to use when drawing.

In an embodiment where adding an image, such as a photograph, is permitted, pictorial addition module 222 may provide a user interface by way of application 111 for browsing to and adding a photograph (e.g., an explorer interface, a web browser, a drag and drop interface, etc.). There are use cases where capturing and adding a new photograph is desired, by either the participant, administrator, or both. For example, where the administrator is a car rental company, and the secure document is a rental contract, the car rental company may wish for the participant to capture images of the car as-received so that the condition of the car when the participant took possession is established. Responsive to detecting a command to add a new photograph (e.g., based on an interaction by the participant with the user interface), mobile device link module 223 may transmit a link to a mobile device of the signer. The link may be transmitted to the mobile device based on pre-existing device or email address information of the participant stored in association with login credentials of the participant with secure document service 130, or the link may be transmitted to an address specified by the participant in connection with the command to add the new photograph. The link, when selected at the mobile device by the user, may cause a camera application of the mobile device to launch. A photograph may be captured by the mobile device upon launch, or upon a command by the user to capture the photograph. The photograph may be automatically transmitted to secure document service 130 to be collated with the secure document. In an embodiment, mobile device link module 223 may output a prompt to the participant to confirm that the captured photograph is suitable prior to, or after, collating the photograph with the secure document.

In an embodiment, pictorial content addition module 221 may enable one or more participants to draw on top of an existing image or drawing. For example, in an airport, a booking agent may wish to issue an airline ticket as a secure document and may wish to draw on the secure document to signify information to a security agent. The security agent may wish to draw, distinguishably, on, over, or adjacent to the booking agent's drawing to signify that a certain activity has occurred. As another example, a mechanic may wish for a recipient of a repaired car to circle components of an image of the repaired car in a secure document to confirm that the recipient agrees that those circled components are fully operational. In any event, pictorial content addition module 222 may accept drawings, and further drawings in relation to the initial drawings, from any number of participants.

In an embodiment, participant annotation module 224 distinguishes pictorial content added by each different participant by annotating the pictorial content to indicate the contributing participant. Annotating, as used herein, may refer to any manipulation of pictorial content to associate given pictorial content with its contributing participant. Participant annotation module 224 may, for example assign different colors, fonts, highlighting, or any other form of differentiation to pictorial content (e.g., doodles) added by different participants. Participant annotation module 224 may annotate pictorial content by placing an identifier in conjunction with (that is, on top of, adjacent to, etc.) pictorial content added by a given participant. The identifier may be a user name, a legal name, or some other moniker associated with the participant. Annotations may be visible in the secure document to others at all times, or may be hidden unless a viewer of the secure document requests to see annotations (e.g., by toggling them on, hovering over pictorial content, and so on). In an embodiment, some annotations may be hidden to some users, depending on permissions programmed in by the administrator of the secure document. In an embodiment, some pictorial content itself may be hidden to some users for similar reasons (e.g., pictorial content added by an airport agent may be hidden from a passenger for airport security reasons).

In an embodiment, an administrator may have required pictorial content to have certain characteristics. For example, an administrator may demand that a photograph having a license plate be incorporated, or may demand that an image including a certain person's face be included. Verification module 225 takes pictorial content and an associated requirement as input, and outputs whether the pictorial content satisfies the requirement. Verification module 225 may perform the verification through any known mechanism, or any mechanism programmed in by the administrator, such as through heuristics, pattern recognition, machine learning, and any combination thereof. Verification module 225 may reject pictorial content that does not satisfy the requirement.

Signature module 226 accepts signatures from signing participants (e.g., a participant using signer device 110). Signature module 226 detects a request to add a signature to a secure document, and responsively adds the signature to the secure document. Signature module 226 determines whether all required signatures, as programmed by the administrator, are added to the secure document. Responsive to determining that all required signatures have been added to the secure document, signature module 226 finalizes the document and disables the ability of participants to modify the secure document.

Secure document storage 231 may be used to store secure documents, whether they are in progress or finalized. Pictorial content storage 232 may be used to store pictorial content added to secure documents. This may be useful, for example, where the administrator wishes to access pictorial content in isolation from the secure document to which it was added.

Figure 3:
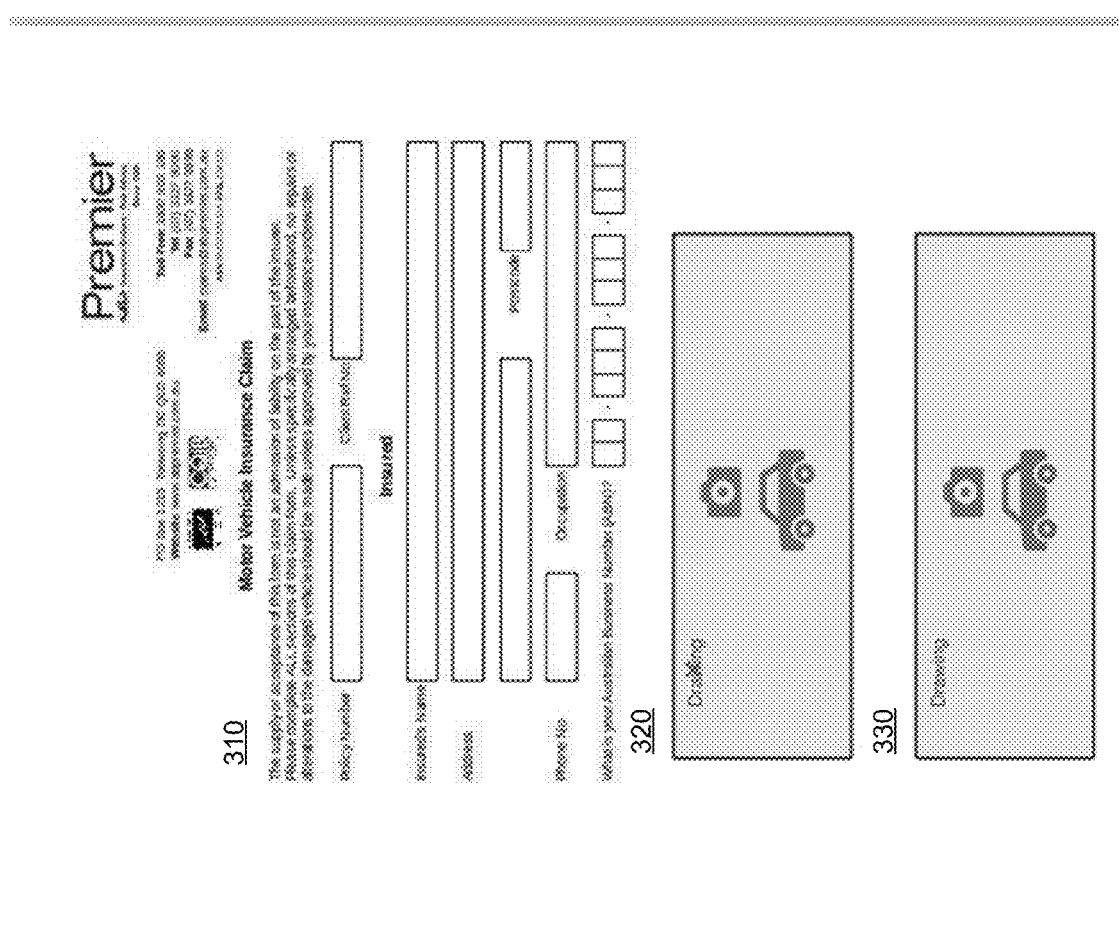
FIG. 3 illustrates one embodiment of a secure document having a region for modification by inclusion of pictorial content.
Figure 4:
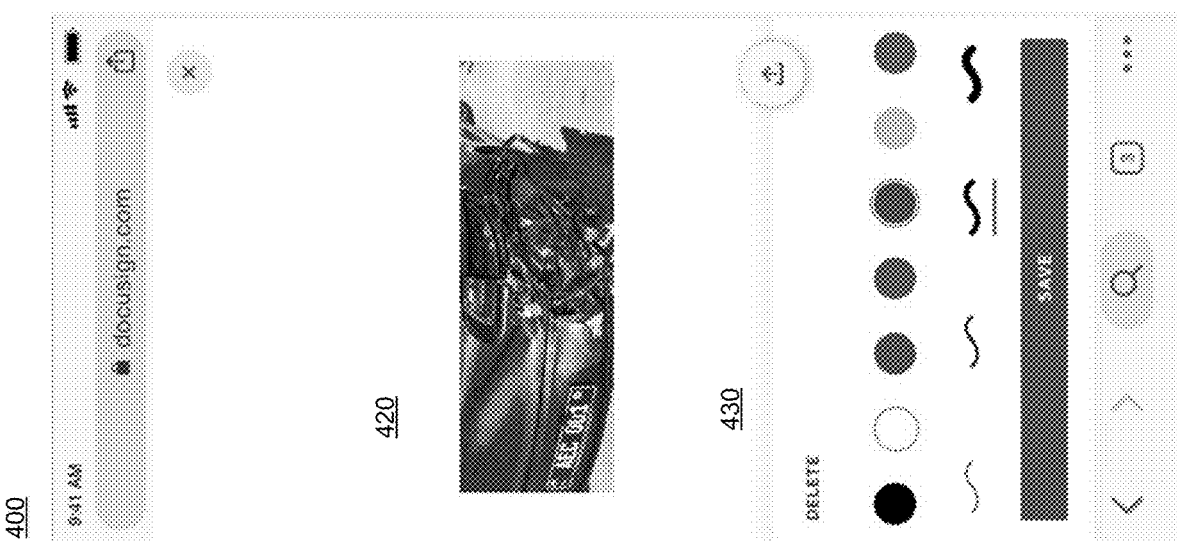
FIG. 4 illustrates one embodiment of a drawing tool for drawing within a secure document.
Figure 5:
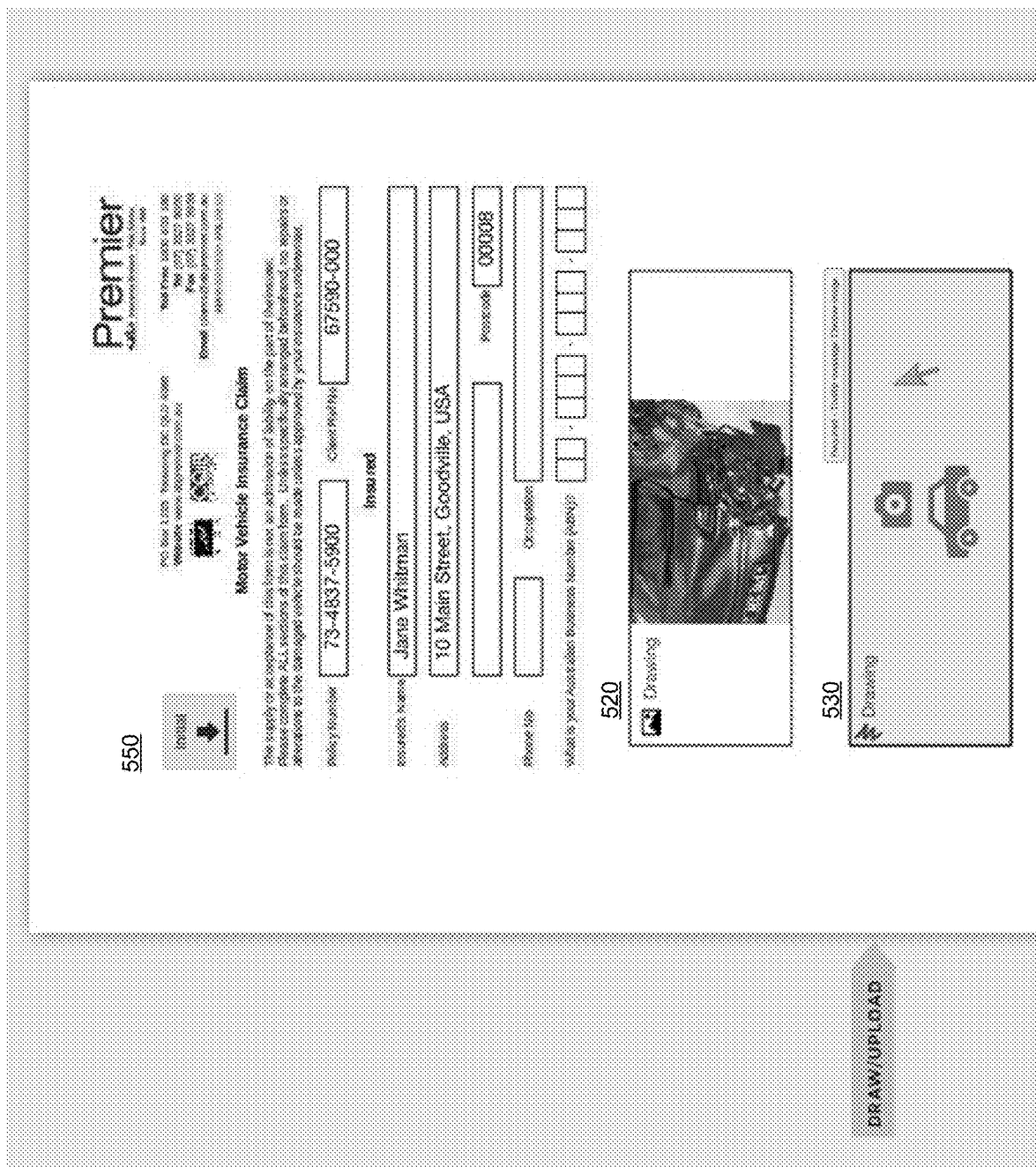
FIG. 5 illustrates one embodiment of a secure document as modified to include pictorial content.

FIGS. 3-5, together, illustrate an exemplary sequence of adding a drawing to a secure document. FIG. 3 illustrates one embodiment of a secure document having a region for modification by inclusion of pictorial content. Secure document 300 was generated by an administrator to have portion 310 be unmodifiable for pictorial content, while including portions 320 and 330 for a signing participant to add pictorial content. Given that FIG. 3 relates to a motor vehicle insurance claim, portions 320 and 330 indicate that a photograph of a vehicle is required to be added. Additional requirements may be present (e.g., a front view in portion 320, and a side view in portion 330, of a vehicle).

FIG. 4 illustrates one embodiment of a drawing tool for drawing within a secure document. User interface 400 includes photograph 420, and drawing tool 430. As depicted, user interface 400 is shown as part of an output by a mobile device, though this is exemplary—photograph 420 and/or drawing tool 430 may be shown via application 111, and may be shown in conjunction with the secure document. Photograph 420 may have been added through any described means, including it having been captured as a new photograph based on the activity of mobile device link module 223. Drawing tool 430 may be used to draw on top of, or in connection with, image 420. Alternatively, or additionally, drawing tool 430 may be used to draw a stand-alone doodle (e.g., in portion 330 of a secure document).

FIG. 5 illustrates one embodiment of a secure document as modified to include pictorial content. Secure document service 130 may add, after a drawing is populated into portion 530, signature section 550, which prompts the participant to add a signature (in this case, in the form of initials). As shown, portion 520 indicates that a photograph is required, and portion 530 indicates that a doodle is required, based on the icons shown in each portion. The secure document prompts the participant to either draw in, or upload a drawing, that comports with the requirements of portion 530. In an embodiment, prompts to add pictorial content may not be visible until a condition is met. For example, secure document service 130 may detect that a radio button corresponding to "car accident" is selected, and may responsively add portion 530 to the secure document shown in FIG. 5.

Computing Machine Architecture

Figure 6:
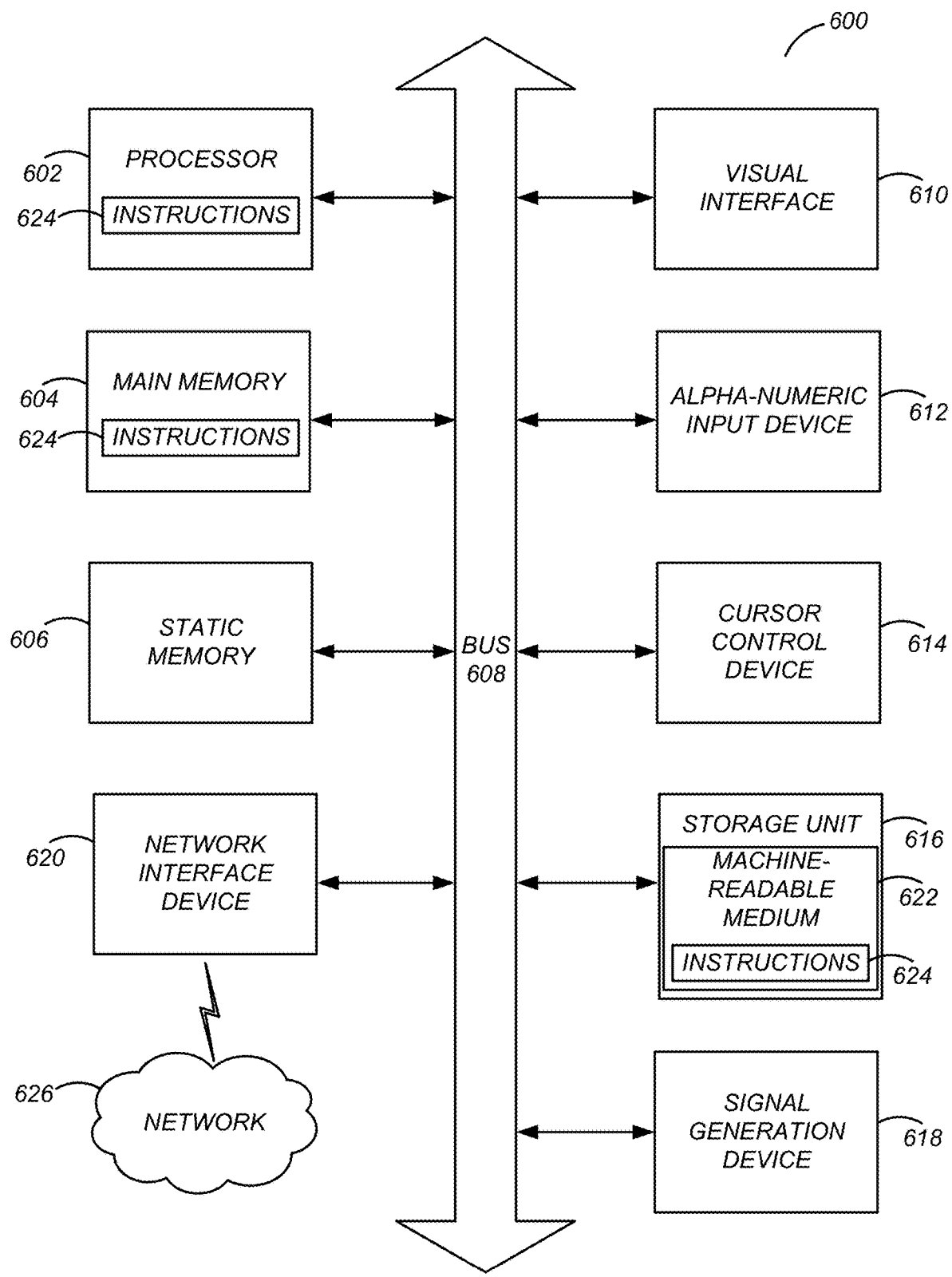
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein. Any client device or service disclosed herein may use some or all functionality described with respect to the machine.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Illustrative Data Flow for Adding Pictorial Content

Figure 7:
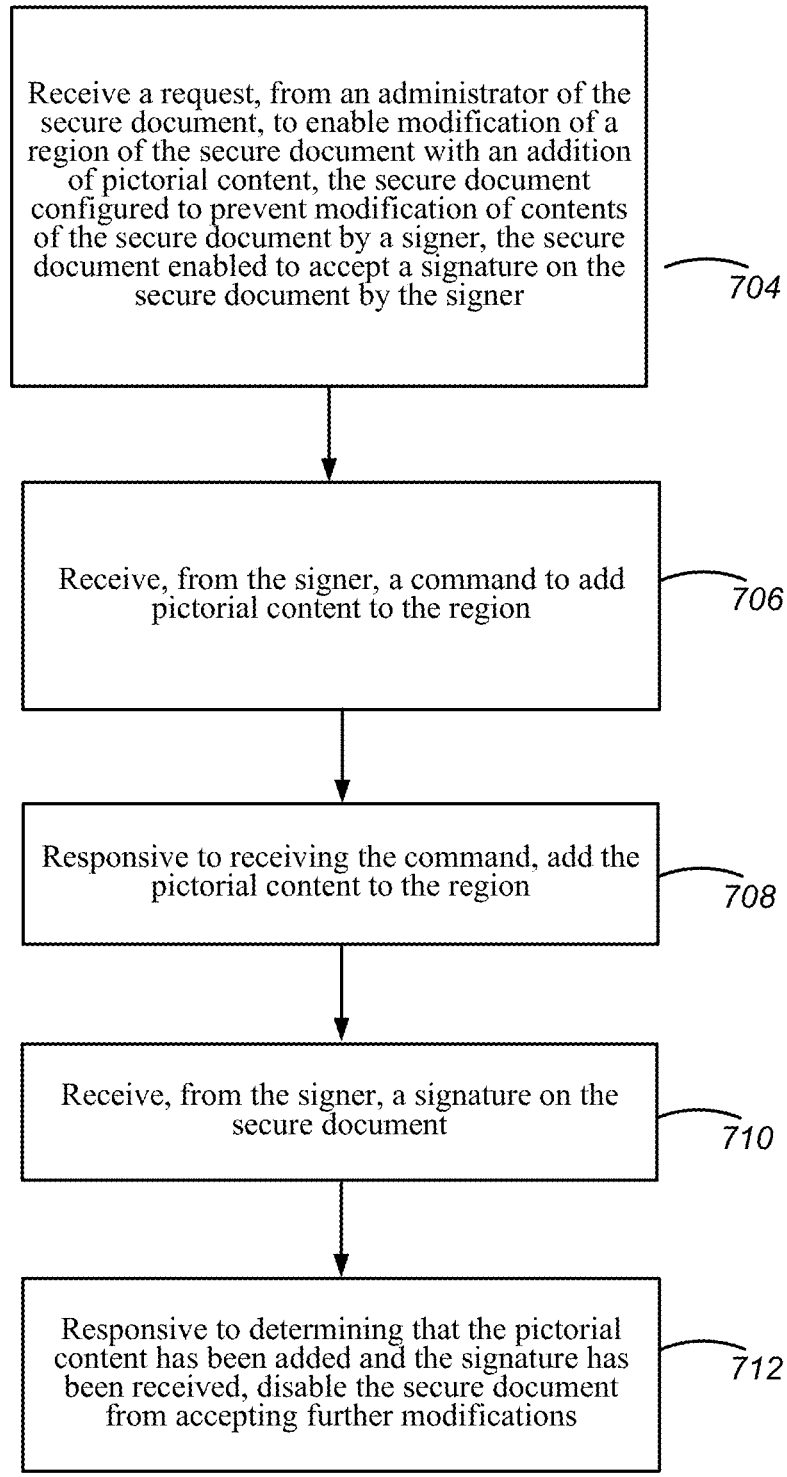
FIG. 7 illustrates one embodiment of an exemplary process for adding pictorial content to a secure document.

FIG. 7 illustrates one embodiment of an exemplary process for adding pictorial content to a secure document. Process 700 begins with secure document service 130 receiving 704 a request (e.g., using pictorial content assignment module 221, as executed by processor 602), from an administrator of a secure document (e.g., using administrator device 115, the secure device accessed from secure document storage 231), to enable modification of a region of the secure document with an addition of pictorial content.

Secure document service 130 receives 706, from the signer (e.g., from signer device 110), a command to add pictorial content (e.g., a photograph, a doodle, or both) to the region (e.g., the command being received using pictorial content addition module 222). In order to add the document, optionally, mobile device link module 223 causes a mobile device of the signer to capture a photograph. Secure document service 130, responsive to receiving the command, adds 708 the pictorial content to the region (e.g., after verified by verification module 225). The pictorial content may be annotated to indicate the contributing participant that added the pictorial content, and annotations may be selectively shown to viewing users of the secure document.

Secure document service receives 710, from the signer, a signature on the secure document. Responsive to determining that the pictorial content has been added and the signature has been received (e.g., that the document is finalized and the last signature has been received), secure document service 130 disables 712 the secure document from accepting further modifications. Disabling may be postponed until all signing participants of the secure documents have in fact signed.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, by one or more processors, from an administrator of a secure document, a request to enable modification of a region of the secure document with an addition of pictorial content, the secure document configured to prevent modification of contents of the secure document by a signer, the secure document enabled to accept a signature on the secure document by the signer, wherein the request to enable modification of the region comprises a set of requirements comprising a requirement that the pictorial content include a predefined object and constraints on drawing on top of the pictorial content;
receiving, by the one or more processors, from the signer, a command to add first pictorial content to the region;
responsive to receiving the command, by the one or more processors, determining whether the first pictorial content meets the requirement by verifying that the predefined object is included in the first pictorial content;
responsive to determining that the first pictorial content meets the requirement, by the one or more processors, adding the first pictorial content to the region;
receiving, from the signer, by the one or more processors, a signature on the secure document;
receiving, by the one or more processors, second pictorial content from a participant in the secure document, wherein the participant is different than the signer;
responsive to determining that the second pictorial content meets the requirement by verifying that the predefined object is included in the second pictorial content, by the one or more processors, adding the second pictorial content to the region;
annotating, by the one or more processors, the first pictorial content with a first annotation by placing an identifier of the signer in conjunction with the first pictorial content, wherein the identifier of the signer comprises at least one of a user name of the signer or a legal name of the signer;
annotating, by the one or more processors, the second pictorial content with a second annotation by placing an identifier of the participant in conjunction with the second pictorial content, wherein the identifier of the participant comprises at least one of a user name of the participant or a legal name of the participant; and
responsive to determining, by the one or more processors, that the first pictorial content has been added, the second pictorial content has been added, and the signature has been received, disabling the secure document from accepting further modifications.

2. The method of claim 1, wherein the first pictorial content is not added to the region responsive to determining that the first pictorial content does not meet the requirement.

3. The method of claim 1, wherein the first pictorial content comprises a photograph, and wherein the method further comprises:
responsive to receiving the command, by the one or more processors, transmitting a link, wherein the link, when selected by the signer at a mobile device, causes the photograph to be captured; and
receiving, by the one or more processors, the photograph, wherein adding the first pictorial content to the region comprises adding the photograph to the region.

4. The method of claim 3, wherein the signer is enabled to mark up the photograph with a drawing tool, and wherein the markup is shown in the region with the photograph.

5. The method of claim 1, wherein annotating the first pictorial content with the identifier of the signer comprises using a first color, and wherein annotating the second pictorial content with the identifier of the participant comprises using a second color different from the first color.

6. The method of claim 1, further comprising:
detecting, by the one or more processors, that a person is viewing the secure document subsequent to disabling the secure document from accepting further modifications;
determining, by the one or more processors, a credential of the person; and
selectively hiding, by the one or more processors, at least one of the first annotation and the second annotation based on the credential.

7. The method of claim 1, wherein the participant, in addition to the signer, has signatory rights, and wherein disabling the secure document from accepting further modifications occurs responsive to determining that the participant has signed the secure document.

8. The method of claim 1, wherein, further responsive to determining that the first pictorial content has been added, the second pictorial content has been added and the signature has been received, a server associated with the administrator receives the first pictorial content and the second pictorial content, wherein the server determines whether the first pictorial content satisfies a criterion and whether the second pictorial content satisfies the criterion, and wherein the server routes the secure document to a destination corresponding to the criterion.

9. The method of claim 1, wherein the request comprises access permissions defining one or more persons who are authorized to modify the region.

10. The method of claim 1, wherein the first pictorial content is generated by the signer using a drawing tool to draw content into the region.

11. The method of claim 1, wherein the request to enable modification of the region comprises an instruction to enable modification responsive to a condition having been met in the context of the secure document.

12. A non-transitory computer-readable medium comprising instructions encoded thereon, the instructions causing one or more processors, when executing the instructions, to perform operations, the instructions comprising instructions to:
receive, from an administrator of a secure document, a request to enable modification of a region of the secure document with an addition of pictorial content, the secure document configured to prevent modification of contents of the secure document by a signer, the secure document enabled to accept a signature on the secure document by the signer, wherein the request to enable modification of the region comprises a set of requirements comprising a requirement that the pictorial content include a predefined object and constraints on drawing on top of the pictorial content;
receive, from the signer, a command to add first pictorial content to the region;
responsive to receiving the command, determine whether the first pictorial content meets the requirement by verifying that the predefined object is included in the first pictorial content;

responsive to determining that the first pictorial content meets the requirement, add the first pictorial content to the region;

receive, from the signer, a signature on the secure document;

receive second pictorial content from a participant in the secure document, wherein the participant is different than the signer;

responsive to determining that the second pictorial content meets the requirement by verifying that the predefined object is included in the second pictorial content, add the second pictorial content to the region;

annotate the first pictorial content with a first annotation by placing an identifier of the signer in conjunction with the first pictorial content, wherein the identifier of the signer comprises at least one of a user name of the signer or a legal name of the signer;

annotate the second pictorial content with a second annotation by placing an identifier of the participant in conjunction with the second pictorial content, wherein the identifier of the participant comprises at least one of a user name of the participant or a legal name of the participant; and responsive to determining that the first pictorial content has been added, the second pictorial content has been added and the signature has been received, disable the secure document from accepting further modifications.

13. The non-transitory computer-readable medium of claim 12, wherein the first pictorial content is not added to the region responsive to determining that the first pictorial content does not meet the requirement.

14. The non-transitory computer-readable medium of claim 12, wherein the first pictorial content comprises a photograph, and wherein the instructions further comprise instructions to:

responsive to receiving the command, transmit a link, wherein the link, when selected by the signer at a mobile device, causes the photograph to be captured; and receive the photograph, wherein adding the first pictorial content to the region comprises adding the photograph to the region.

15. The non-transitory computer-readable medium of claim 14, wherein the signer is enabled to mark up the photograph with a drawing tool, and wherein the markup is shown in the region with the photograph.

16. A system comprising:
memory with instructions encoded thereon; and
one or more processors that, when executing the instructions, are caused to perform operations comprising:
receiving, from an administrator of the secure document, a request to enable modification of a region of the secure document with an addition of pictorial content, the secure document configured to prevent modification of contents of the secure document by a signer, the secure document enabled to accept a signature on the secure document by the signer, wherein the request to enable modification of the region comprises a set of requirements comprising a requirement that the pictorial content include a predefined object and constraints on drawing on top of the pictorial content;

receiving, from the signer, a command to add first pictorial content to the region;

responsive to receiving the command, determining whether the first pictorial content meets the requirement by verifying that the predefined object is included in the first pictorial content;

responsive to determining that the first pictorial content meets the requirement, adding the first pictorial content to the region;

receiving, from the signer, a signature on the secure document;

receiving second pictorial content from a participant in the secure document, wherein the participant is different than the signer;

responsive to determining that the second pictorial content meets the requirement by verifying that the predefined object is included in the second pictorial content, by the one or more processors, adding the second pictorial content to the region;

annotating the first pictorial content with a first annotation by placing an identifier of the signer in conjunction with the first pictorial content, wherein the identifier of the signer comprises at least one of a user name of the signer or a legal name of the signer;

annotating the second pictorial content with a second annotation by placing an identifier of the participant in conjunction with the second pictorial content, wherein the identifier of the participant comprises at least one of a user name of the participant or a legal name of the participant; and responsive to determining that the first pictorial content has been added, the second pictorial content has been added and the signature has been received, disabling the secure document from accepting further modifications.

17. The system of claim 16, wherein, further responsive to determining that the first pictorial content has been added, the second pictorial content has been added and the signature has been received, a server associated with the administrator receives the first pictorial content and the second pictorial content, wherein the server determines whether the first pictorial content satisfies a criterion and whether the second pictorial content satisfies the criterion, and wherein the server routes the secure document to a destination corresponding to the criterion.

18. The system of claim 16, wherein the request comprises access permissions defining one or more persons who are authorized to modify the region.

* * * * *